No. 894,394.
R. C. REDPATH.
PATENTED JULY 28, 1908.
AUTOMATIC BALE WIRING MECHANISM FOR BALING PRESSES.
APPLICATION FILED OCT. 3, 1906.
5 SHEETS—SHEET 1.
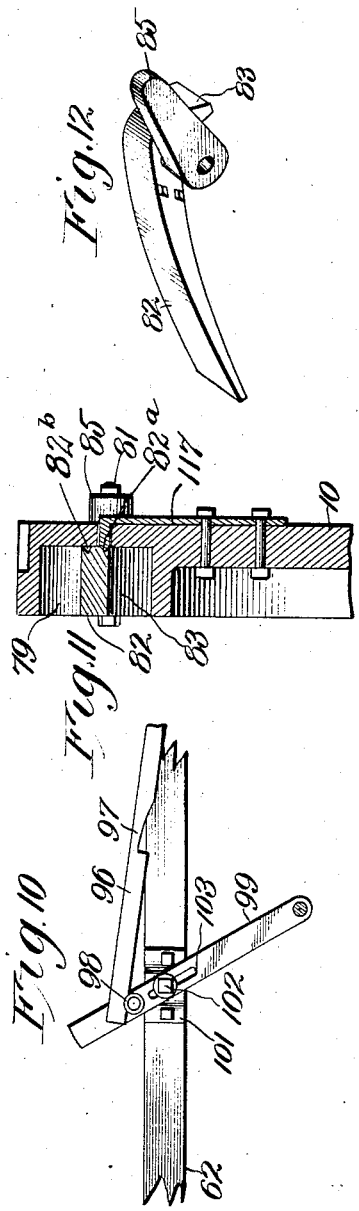
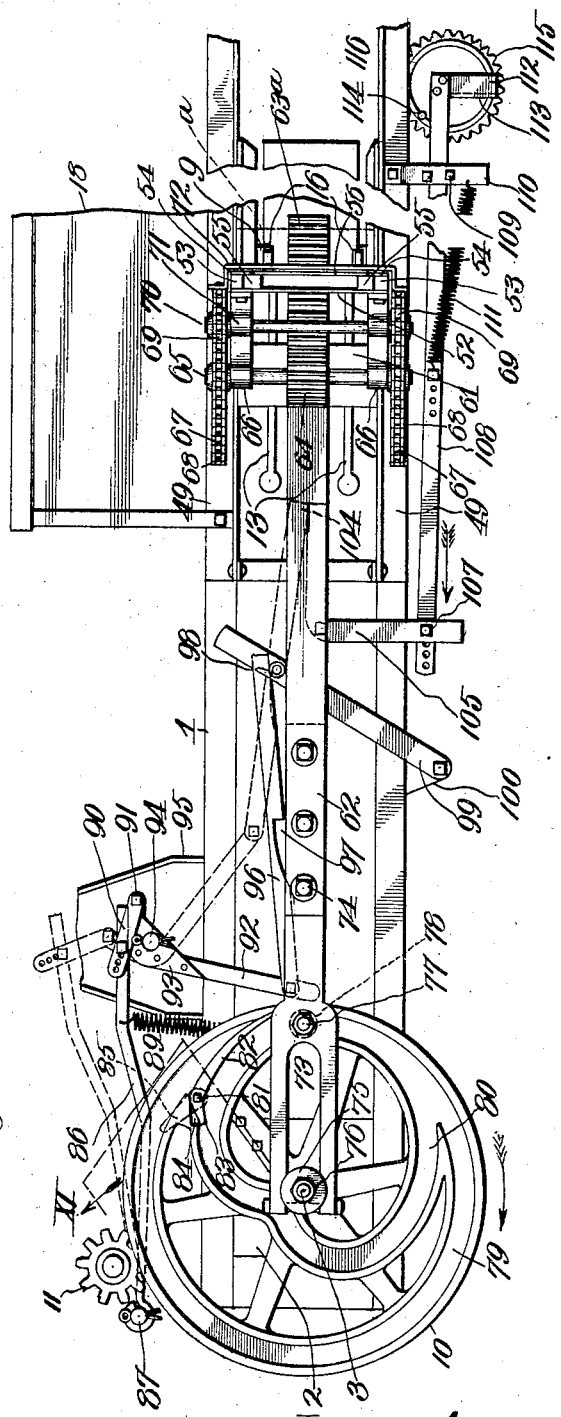
Witnesses
Frank R. Glore.
H. C. Rodgers
Inventor
R. C. Redpath
By George H. Loupe Atty.

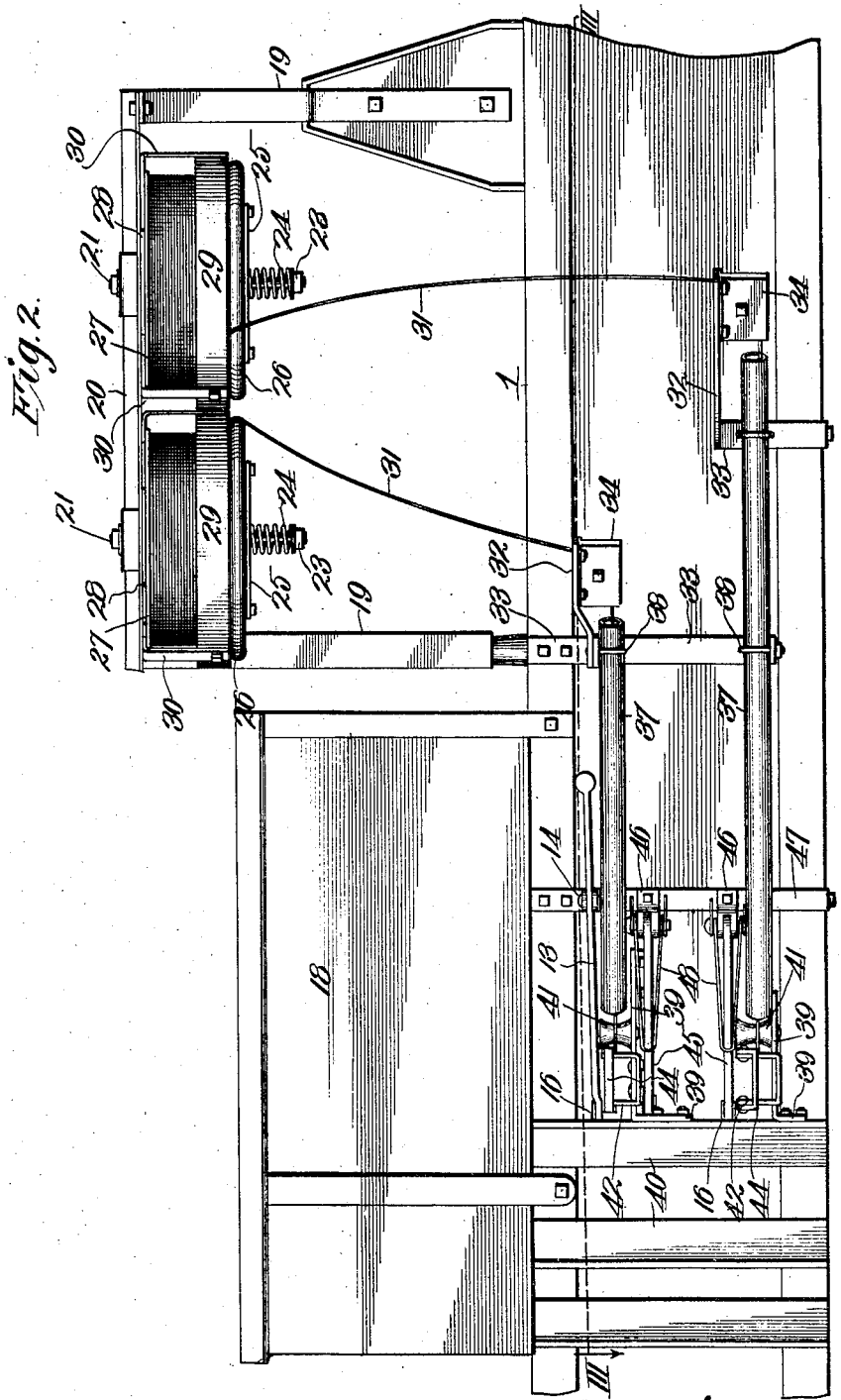

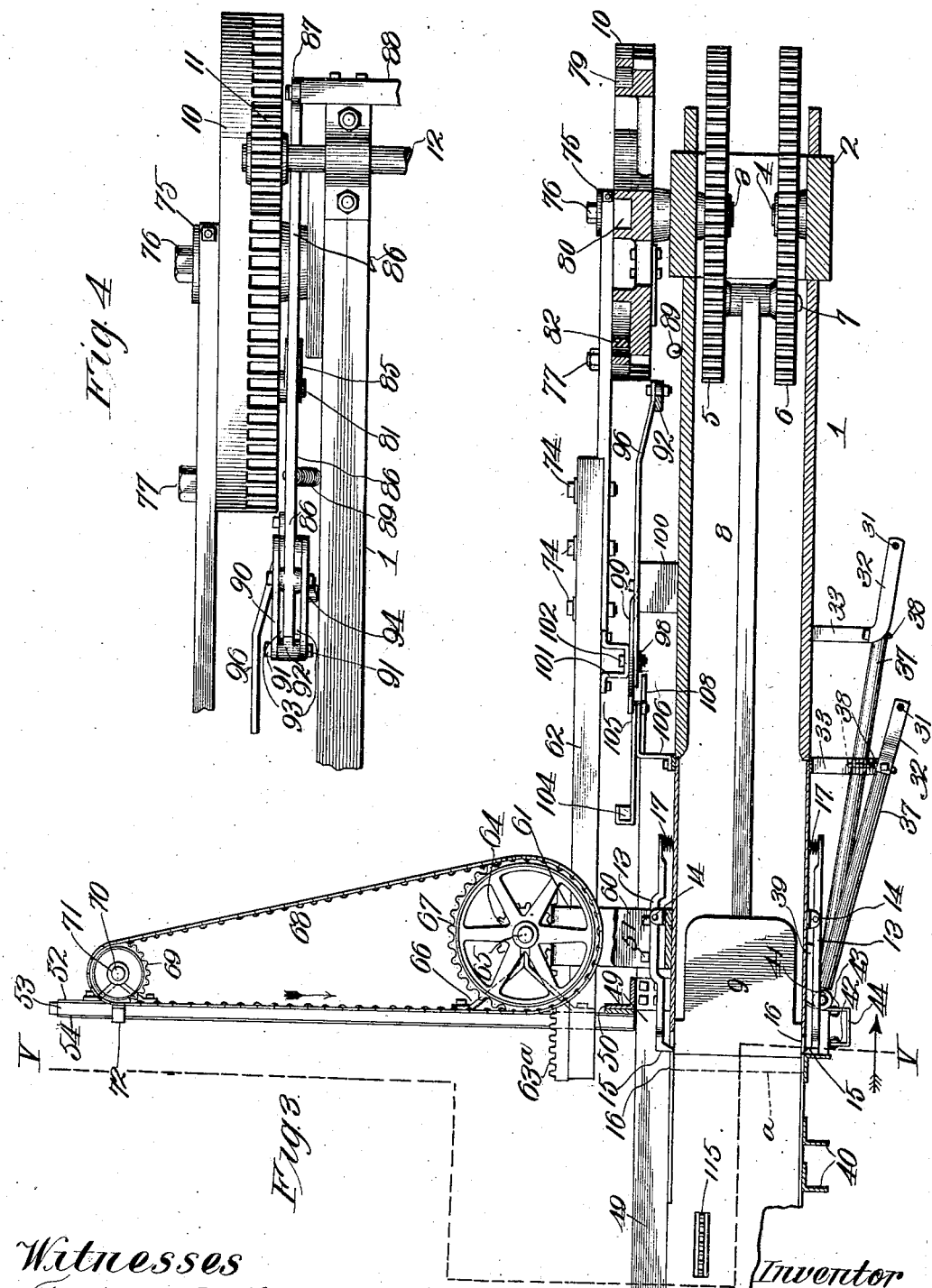

No. 894,394. PATENTED JULY 28, 1908.
R. C. REDPATH.
AUTOMATIC BALE WIRING MECHANISM FOR BALING PRESSES.
APPLICATION FILED OCT. 3, 1906.
5 SHEETS—SHEET 4.
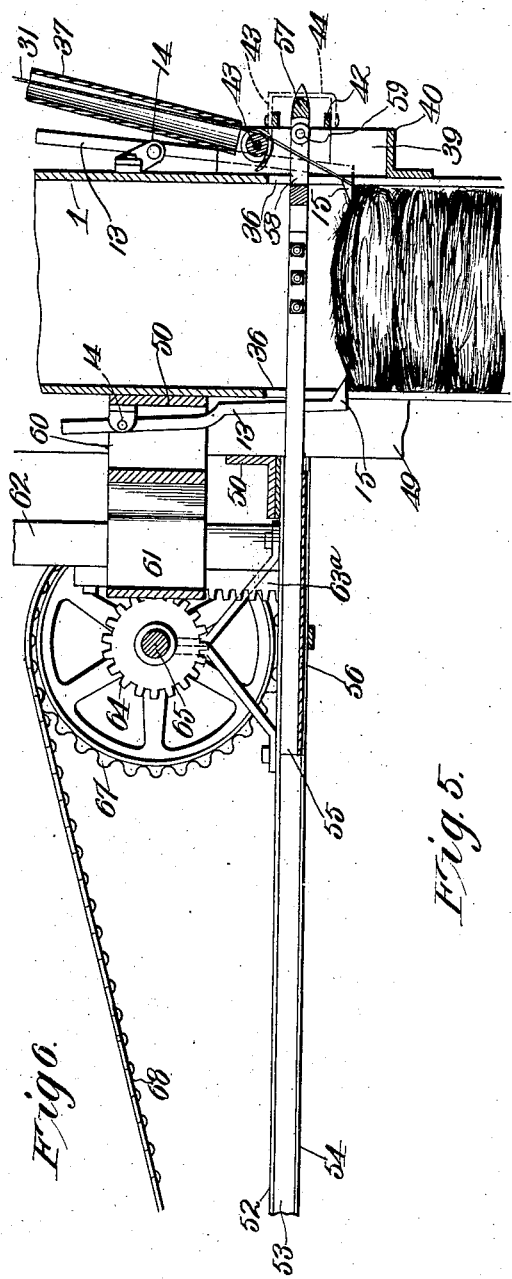
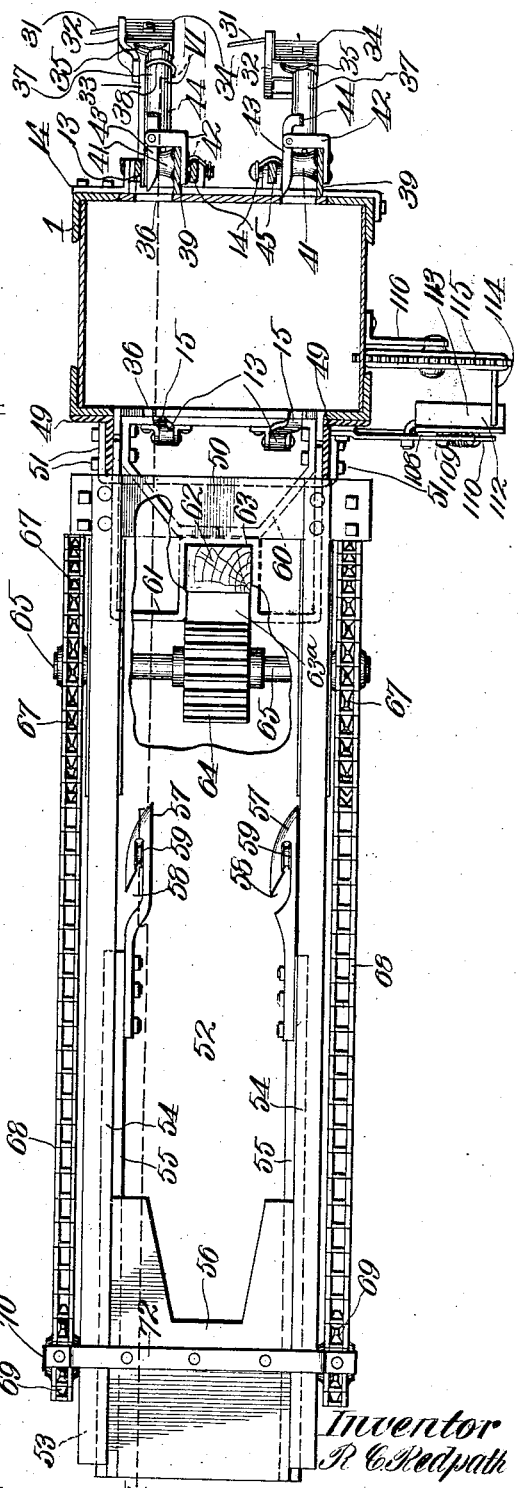
Witnesses
Frank R Glore
H. C. Rodgers
Inventor
R. C. Redpath
By George H. Thorpe Atty.

No. 894,394. PATENTED JULY 28, 1908.
R. C. REDPATH.
AUTOMATIC BALE WIRING MECHANISM FOR BALING PRESSES.
APPLICATION FILED OCT. 3, 1906.
5 SHEETS—SHEET 5.
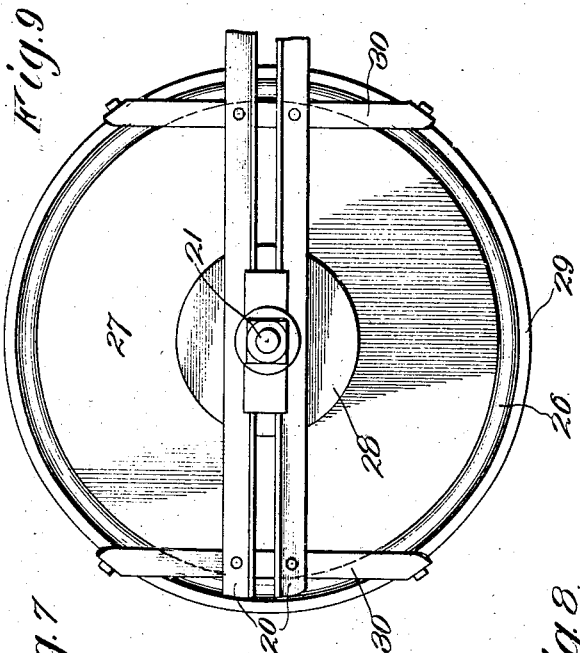
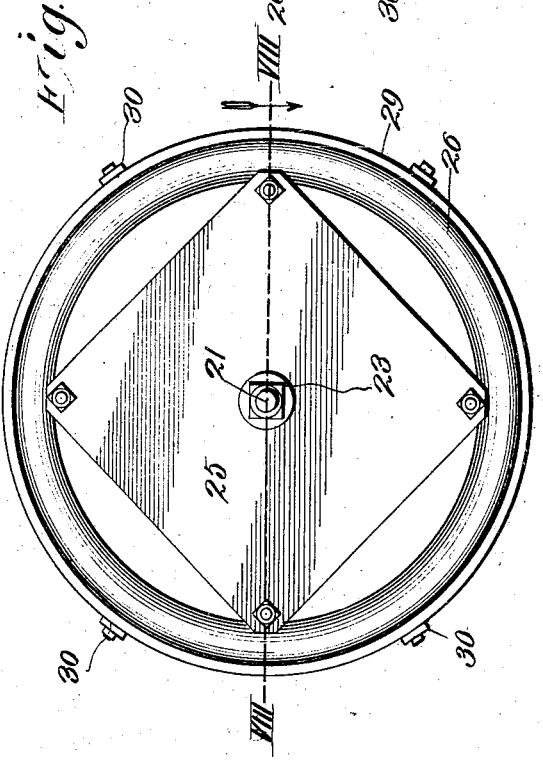
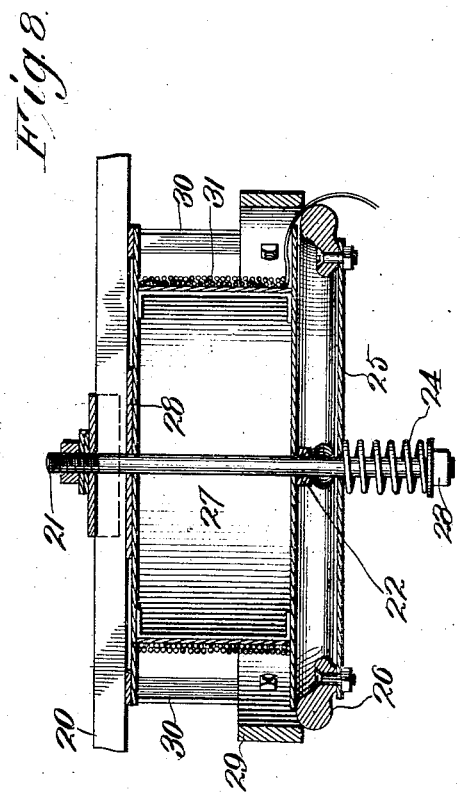
Witnesses
Frank R. Glore
H. C. Rodgers
Inventor
R. C. Redpath
By George J. Thorpe Atty.

UNITED STATES PATENT OFFICE.

ROBERT C. REDPATH, OF OXFORD TOWNSHIP, JOHNSON COUNTY, KANSAS.

AUTOMATIC BALE-WIRING MECHANISM FOR BALING-PRESSES.

No. 894,394.  Specification of Letters Patent.  Patented July 28, 1908.

Application filed October 3, 1906. Serial No. 337,299.

*To all whom it may concern:*

Be it known that I, ROBERT C. REDPATH, a citizen of the United States, residing in Oxford township, in the county of Johnson and State of Kansas, have invented certain new and useful Improvements in Automatic Bale-Wiring Mechanism for Baling-Presses, of which the following is a specification.

This invention relates to hay presses and my object is to produce a hay press provided with means for automatically placing the bale wires around the bale and disposing the ends of the same in such relation that they can be easily and conveniently tied to complete the formation of the bale prior to its expulsion from the machine.

With this general object in view and others as hereinafter appear, the invention consists in certain novel and peculiar features of construction and organization as hereinafter described and claimed; and in order that it may be fully understood reference is to be had to the accompanying drawings, in which—

Figure 1, is a side view of a portion of a hay press embodying my invention. Fig. 2, is an enlarged view of a portion of the opposite side of the press. Fig. 3, is a horizontal section taken on the line III—III of Fig. 2; said section also disclosing the mechanism shown in Fig. 1, the scale being the same as the last-named figure. Fig. 4, is enlarged plan view of a portion of the front end of the press. Fig. 5, is a cross section on the same scale as Fig. 2, taken on the line V—V of Fig. 3. Fig. 6, is a horizontal section taken on the line VI—VI of Fig. 5, but with the needles advanced. Fig. 7, is an enlarged inverted plan view of one of the reels. Fig. 8, is a central vertical section taken on the line VIII—VIII of Fig. 7. Fig. 9, is a top view of the reel and its support. Fig. 10, is a view of parts mainly shown in Fig. 1. Fig. 11, is a section on the dotted line XI of Fig. 1 to show the spring detent for holding the switch in one of its positions or the other. Fig. 12, is a detail perspective view of the switch and the arm whereby it is operated.

In the said drawings, 1 indicates the body portion of an engine power hay press, which body portion may be of any suitable or preferred type.

2 indicates a heavy casting forming a part of the front end of the body portion and providing a journal at one side for a short transverse shaft 3, an alined stub shaft 4 projecting inwardly from the opposite side of the casting.

5 indicates a large gear wheel secured rigidly on shaft 3, and 6 a similar wheel journaled on the stub shaft 4 and connected rigidly to wheel 5 by cross pin 7; said cross pin forming a crank for shaft 3 and a pivot for the front end of pitman 8, provided at its opposite end with a plunger 9 of the type shown or of any other suitable or preferred type, said plunger being reduced in width for the major portion of its length as shown in Fig. 3, so as to operate between thicker portions of the side walls of the body portion 1, it being also understood that the pitman is pivotally connected at its rear end to the plunger so as to accommodate the vertical movement imparted to its front end by the revolving crank 7.

10 indicates a large gear wheel secured rigidly on the outer end of shaft 3, and meshing with a pinion 11 on shaft 12 adapted to be driven by any suitable means not shown, to operate the wheel 10 in the direction indicated by the arrow, Fig. 1.

In Figs. 1 and 3 the plunger is in the position which it occupies as the needles, hereinafter described, start on their travel by which they draw the tie wires across the rear end of a bale, and the parts are so proportioned that during such travel of the needles said plunger moves forward to approximately the position indicated by the dotted line *a* of Figs. 1 and 3, which line is shown a short distance rearward of the retainers 13 pivoted at 14 to the outer sides of the baling case end of the body portion 1, the retainers having the usual beveled hook ends 15 at their rear ends which are normally held pressed within the case through the openings 16 in the sides thereof by springs 17 interposed between the case and the rear ends of the retainers. As the plunger makes its power stroke it engages the beveled sides of said hooks and forces the retainers outward as indicated in Fig. 3, the said hooks being instantly reprojected into the case on the withdrawal of the plunger so as to limit the forward expansive movement of the compressed bale, in the customary manner.

Above the baling case end the machine is provided with the usual hopper 18 through which the baling material is fed in any suitable manner and forward of said hopper at the side of the machine occupied by gear wheel 6 by preference, a frame is erected rigidly on the body portion, said frame consisting preferably of a pair of uprights 19 connected by longitudinal bridge bars 20.

21 indicates a pair of vertical bolts depending rigidly from bridge bars 20 and provided a suitable distance above their lower ends with heads 22 and equipped below said heads with nuts 23 and expansive springs 24 interposed between the nuts and plates 25 provided with a rounded rim 26, said plates fitting with sufficient looseness on the bolts to have a slight rocking movement.

27 indicates hollow drums rigid on bolts 21 and resting on the heads 22 thereof with their lower flanges above and adapted to limit tilting movement of rims 26, washers 28 being interposed between the bridge bars and the upper sides of the drums to prevent them from being raised by the upward pressure of said rims.

29 indicates friction and guide rings surrounding the lower flanges of the drums just above and in frictional contact with rims 26, near the outer surfaces or peripheries of the same, and 30 hangers carrying said rings and secured at their opposite ends in any suitable manner to the bridge bars 20 of the drums. Wire 31 is wound upon each drum in the usual manner and extends from the same down between the friction rim and ring thereof, and then downward through an apertured bar 32 secured to an angle bracket 33, the bracket and bar for the wire from which are produced the lower wires for the bales being disposed in a lower plane than the corresponding parts for the other wire, as shown most clearly in Fig. 2. Secured to each bracket is a depending U-shaped bracket 34 containing a suitably journaled grooved roller 35, and extending rearwardly from said rollers and toward openings 36 in the baling case contiguous to the upper and lower openings 16, are wire guide tubes 37 secured by preference by U-bolts 38 to brackets 33, and journaled on brackets 39 secured to vertical angle bars 40 and at the rear end of the baling case are grooved rollers 41, the wires from the drums extending under the guide rollers 35 then through the tubes 37 and around the grooved rollers 41 from which rollers they extend through openings 36 into the rear end of the baling chamber along the contiguous side of which they extend to the rear end of the bale, then across such end to the opposite side of the bale, then forwardly along said side of the bale and outwardly through the companion openings 36 in the side wall of the baling case opposite to that adjacent to the guide tubes.

Secured to brackets 39 outward of the vertical plane of the outer sides of the grooved rollers 41 are U-shaped standards 42 and pivoted between said standards and disposed horizontally are wire depressing frames consisting of inwardly projecting arms 43 above the wires, connected at their outer ends by cross bars 44.

45 indicates a pair of segmental retainers at the side of the baling case occupied by the wire guide and depressing mechanism above described, said retainers being in all essential particulars of the same construction as those described. They are pivoted to brackets 46 secured to a vertical strip 47 carried by the baling case and held pressed yieldingly into the baling case by means of springs 48.

49 indicates longitudinal angle plates secured to the baling case at the side occupied by gear wheel 10, and near its upper and lower corners, and 50 a vertical angle plate having the upper and lower ends of one of its arms bent to engage angle plate 49 and secured to the same as at 51, and secured to and projecting outwardly from said angle plate at right angles to the baling case is a needle-guide frame consisting of a plate 52 arranged edgewise, longitudinal bars 53 secured to the rear face of said plate at its upper and lower edges, and longitudinal plates 54 secured to bars 53, respectively projecting below the upper and above the lower one, and mounted reciprocally in the upper and lower grooves thus formed in the guide frame, is a reciprocatory needle frame consisting of longitudinal bars 55 in said grooves, a bifurcated plate 56 connecting the outer faces of said bars, and a pair of needles 57 secured to the inner ends of said bars, and provided at their upper sides with eyes 58 to receive and guide the wires into engagement with the grooved rollers 59, said eyes being disposed in about the horizontal plane of the cross bars 44 of the wire depressing levers 43 as shown in Fig. 5, so that when the needles travel across the baling chamber they will pass through the openings 36 therein and below said cross bars of the levers, the position of the needles being such that in such movement they will pass between the standards 42. As the needles pass through the standards they will engage said cross bars and raise the same and operate the levers to cause their inner ends to press downwardly on the adjacent wires and force the same downward into the eyes 58 and retain them in such position until the needle starts to reverse this movement, in which action the wires engage the grooved rollers 59. In this reverse movement the portions of the wires between the needles and the bale are clamped so tightly by the latter against the contiguous side wall of the case that they cannot slip and as a result additional wire is withdrawn from the drums, the pull of the wires causing the same to unwind from the drums without turning the latter the rims tilting slightly to accommodate such movement of the wires. The instant the pull on the wire ceases the rims under the pressure of the springs 24, reclamp the wire and thus prevent any surplus wire from unwinding from the drums.

60 indicates a vertical frame rigidly secured to the baling case forward of the angle plate 50, and secured to said frame and also between the same and the angle plates 49 is a guide frame 61 for a reciprocatory bar 62 projecting at its front end through an opening 63 in the plate 52 of the needle guide frame hereinbefore described, and in this connection it is to be understood that the bifurcation in plate 56 is provided in order to permit said plate to move toward the baling case a sufficient distance for the needles to perform their proper function without interference on the part of the reciprocatory bar 62 or the rack bar 63ª secured to the outer side of said bar. Said rack bar is engaged by a cog wheel 64 mounted on a vertical shaft 65 journaled in bearing brackets 66 secured to the front face of plate 52, and also secured rigidly on the upper and lower ends of said shaft are sprocket wheels 67 connected by sprocket chains 68 to small sprocket wheels 69, secured on vertical shaft 70 journaled in brackets 71, secured to the front side of plate 52 near the outer end of the same, and secured to the inner strand of said chain so as to reciprocate at the rear side of plates 54 of the needle guide frame is a vertical bar 72 riveted or otherwise rigidly secured to the plate 56 of the reciprocatory needle frame.

73 indicates a longitudinal slot in the front end of reciprocatory bar 62, the slotted end being preferably of metal bolted as at 74 to the wood portion as shown most clearly in Fig. 3, and said slot engages the outer end of shaft 3, and is retained thereon and close to the outer face of wheel 10, by means of a washer 75 and nut 76, the latter engaging the reduced end of the shaft.

77 indicates a pin carried by reciprocatory bar 62, and 78 a roller journaled on said pin and adapted to travel in a circular groove 79 in the outer face of wheel 10 or in a substantially heart-shaped groove 80 in the outer face of said wheel and opening into the main groove 79.

At the junction of the outer wall of the eccentric groove the wheel 10 is equipped with a short shaft 81 and rigidly secured on the outer end of said shaft in the vertical plane of said slot of the groove, is a switch 82, adapted when occupying the position shown in Fig. 1 to form an extension of said outer wall of the groove to the outer wall of the main groove.

83 indicates a short arm integral with switch 82 and disposed at the opposite side of shaft 81 and adapted when said switch occupies the position shown in dotted lines Fig. 1, so as to form a part of the inner wall of the main groove and close the contiguous end of the eccentric groove, to occupy the recess 84 in the outer wall of the last-named groove.

85 indicates a crank arm projecting upwardly from shaft 81 between wheel 10 and the contiguous side of the body portion 1, (see Fig. 4), in the vertical path of movement of a lever 86 pivoted as at 87 to a bracket 88 rigid with the front end of said body portion, and 89 is a retractile spring connected at its opposite ends to lever 86 and the body portion 1 for the purpose of holding the free end of the lever yieldingly depressed.

90 indicates links pivoted to the free end of lever 86 and pivoted at their opposite ends as at 91 to the upper end of a hook-shaped bar 92, and bridging the hook of said bar and secured rigidly to the same are plates 93 journaled on a cross pin 94 projecting from a standard 95 secured upon the contiguous angle iron of body portion 1; said pin forming the pivotal point for the hook bar 92. The lower end of the hook bar is pivoted to a longitudinally extending bar 96 and provided with a notch 97 in its underside for engagement with a pin 98 carried by a swing bar 99 pivoted at its lower end on a bracket 100 depending from the body portion 1. The bar 96 rearward of the notch 97 rests upon said pin 98 when the parts are in the position shown in Fig. 1.

Secured to the inner side of bar 62 is a bracket 101, having a pin 102, pivotally engaging a slot 103 in swing bar 99 for the purpose of imparting swinging movement to said bar; the forward movement of said bar resulting in its pin 98 engaging notch 97, and its rearward movement in moving bar 96 from the position shown in full lines to the position shown in dotted lines Fig. 1, the last-named movement disposing said bar 96 vertically above the widened rear end 104 of the horizontal arm of a bell crank lever 105, pivoted to a bracket 106, secured to the body portion 1, see Fig. 3. The depending arm of the bell crank lever 105, is pivotally connected at 107 to a longitudinal bar 108 mounted slidingly between a U-bolt or clip 109 carried by a bracket 110 rigidly secured to and depending from the lower angle bar 49, a retractile spring 111 connecting the bar 108 with bracket 110 for the purpose of holding the parts yieldingly in the position shown in Fig. 1.

112 indicates an angle arm rigidly secured to and depending from the rear end of bar 108 with its inwardly projecting arm 113 in the path of movement of a pin 114 projecting outward from a toothed wheel 115 suitably journaled on a bracket 116 depending from the bottom of the baling case; said wheel 115 being of such diameter that it projects up into the bottom of the baling case for frictional engagement by the baling material as the latter is compressed and moved under the impact of the plunger. The length of each bale will correspond to the circumference of said toothed wheel, so that with each revolution of the latter said pin will engage arm 113 of angle arm 112 and move the bar 108 forwardly as indicated by the arrow Fig. 1, this action resulting in depressing the widened or hammer end of bell crank lever 105 and at the same time stretching spring 111, so that as the pin 114 clears the upper end of angle arm 113 said spring will quickly reverse the movement of bar 108 and cause the hammer end of lever 105 to strike upwardly against the superposed end of bar 96 when in the position shown in dotted lines Fig. 1, and thus trip the same from engagement with pin 98. As this action takes place spring 89 which was placed under tension by the upward movement of lever 86 induced by the rearward movement of bar 96, pulls said lever 86 downward to the position shown in full lines Fig. 1, and pulls bar 96 forward to the position shown in full lines same figure.

At about the time lever 86 is drawn down to the last named position, the switch arm 85 with wheel 10 rotating in the direction indicated by the arrow Fig. 1, is some distance forward of shaft 3 with the switch 82 forming a portion of the inner wall of groove 79 and consequently with said switch arm 85 projecting outward to approximately the plane of the periphery of said wheel so that it shall engage and be forced inward by said depressed lever 86, this action causing the switch to operate pivotally and be disposed in the position shown in full lines Figs. 1 and 11 where it forms the outer wall of the cam groove 80, and is held in such position by the engagement with its countersink 82$^a$ of the bevel ended spring detent 117 secured to a spoke of wheel 10, so that on the next revolution of the wheel, the roller 78 will be caused to enter the cam groove and as a result move bar 62 forwardly. After the wheel is revolved a distance sufficient to carry the roller to the pivotal point of the switch 82, arm 83 of the latter strikes and is pushed outwardly into notch 84 by said roller and as a result the switch is swung inward to again form the inner wall of the outer or circular groove 79 of wheel 10, in which position it is secured by the engagement of its countersink 82$^b$ by the spring detent 117. The forward movement of the bar 62 through the medium of the rack and pinion causes sprocket chain 68 to move in the direction indicated by the arrow, Fig. 3, and draws the needles inwardly or toward the baling case. As this movement takes place the plunger which is moving continuously, travels from the position shown in full lines Fig. 3 to the position shown by dotted line $a$ same figure, and reverses such movement and attains a position forward of the plane of movement of the needles by the time the latter begin to enter the baling case, the plunger continuing such forward or withdrawing movement as the needles travel transversely through the baling case and eventually project beyond the opposite side of the same, attaining their limit of movement by the time the roller 78 engages that portion of the cam groove 80 nearest the shaft 3. In such movement the needles are caused to operate as hereinbefore explained, and during the reverse movement of the needles the bar 62 moves rearward and incidentally through its engagement with notch 97 restores bar 96 to the position shown in dotted lines and consequently through the hook-shaped bar 92 pivoted on pin 94 and link 90, reëlevates lever 86 to the position shown in dotted lines so that the latter is out of the path of the switch arm 85. In the next and all subsequent revolutions of the wheel 10 until the toothed wheel 115 again completes a revolution by the formation of a second bale, roller 78 remains in groove 79 and as a consequence the bar 62 and the needles remain stationary.

In practice with the parts proportioned as shown the needles operate about once in every ten feeds so that it takes about ten average feeds to complete a bale. During the feeding operation which follows the withdrawal of the needles, the operator cuts the wire which is drawn in doubled form across the end of the bale and therefore in advance of the next bale to be formed and draws the ends of that portion engaging the completed bale against its unengaged side, to permit them to be fastened or tied together in the usual or any preferred manner. All subsequent operations being repetitions of those described, further recapitulation is unnecessary.

From the above description it will be apparent that I have produced a baling press of the character described possessing the features of advantage enumerated and which may be modified in many particulars without departing from spirit and scope of the appended claims.

Having thus described the invention what I claim as new and desire to secure by Letters Patent, is:—

1. In a machine of the character described, a wheel provided with a concentric circular groove, and an eccentric cam groove opening at its ends into the circular groove, and a switch adapted at times to form a portion of the inner wall of the concentric groove and at other times a portion of the outer wall of the cam groove.

2. In a machine of the character described, a wheel provided with a concentric circular groove, and an eccentric cam groove opening at its ends into the concentric groove, and a switch pivoted to said wheel and at times forming a portion of the inner wall of the concentric groove and a closure for the contiguous end of the cam groove, and at other times a portion of the outer wall of the cam groove and a closure for the concentric groove.

3. In a machine of the character described, a wheel provided with a concentric circular groove and an eccentric cam groove opening into the concentric groove at its ends, and with a notch opening into the eccentric groove, a switch pivoted to the wheel and adapted to form at times a portion of the inner wall of the concentric groove and at other times a portion of the outer wall of the cam groove, and an arm rigid with the switch and adapted to occupy the notch when said lever forms a portion of the inner wall of the concentric groove and to project into the cam groove when said switch forms a portion of the outer wall of the same.

4. In a machine of the character described, a wheel provided with a concentric circular groove and an eccentric cam groove opening into the concentric groove at its ends, and with a notch opening into the eccentric groove, a switch pivoted to the wheel and adapted to form at times a portion of the inner wall of the concentric groove and at other times a portion of the outer wall of the cam groove, an arm rigid with the switch and adapted to occupy the notch when said switch forms a portion of the inner wall of the concentric groove and to project into the cam groove when said switch forms a portion of the outer wall of the same, and means for yieldingly holding the switch in its last-named position.

5. In a machine of the character described, a wheel provided with a concentric circular groove and an eccentric cam groove opening at its ends into the circular groove, a switch adapted at times to form a portion of the inner wall of the concentric groove and at other times a portion of the outer wall of the eccentric groove, and a bar mounted to reciprocate radially of said wheel and provided with a roller engaging the concentric groove when the switch forms a portion of the inner wall of the same, and to engage the cam groove and be reciprocated thereby when said switch forms a portion of the outer wall of the same.

6. In a machine of the character described, a wheel provided with a concentric circular groove and an eccentric cam groove opening at its ends into the circular groove, a switch adapted at times to form a portion of the inner wall of the concentric groove and at other times a portion of the outer wall of the eccentric groove, a bar mounted to reciprocate radially of said wheel and provided with a roller engaging the concentric groove when the switch forms a portion of the inner wall of the same and to engage the cam groove and be reciprocated thereby when said switch forms a portion of the outer wall of the same, a needle arranged to reciprocate transversely of the baling case, and means whereby each complete reciprocation of said bar shall cause said needle to pass transversely through the baling case and return to its original position.

7. In a machine of the character described, a wheel provided with a concentric circular groove and an eccentric cam groove opening at its ends into the circular groove, a switch adapted at times to form a portion of the inner wall of the concentric groove and at other times a portion of the outer wall of the eccentric groove, a bar mounted to reciprocate radially of said wheel and provided with a roller engaging the concentric groove when the switch forms a portion of the inner wall of the same and to engage the cam groove and be reciprocated thereby when said switch forms a portion of the outer wall of the same, a needle arranged to reciprocate transversely of the baling case, means whereby each complete reciprocation of said bar shall cause said needle to pass transversely through the baling case and return to its original position, and means for causing said switch to move inward and form a portion of the inner wall of the concentric groove before the needle resumes its original position.

8. In a machine of the character described, a wheel provided with a concentric circular groove and an eccentric cam groove opening at its ends into the circular groove, a switch adapted at times to form a portion of the inner wall of the concentric groove and at other times a portion of the outer wall of the eccentric groove, a bar mounted to reciprocate radially of said wheel and provided with a roller engaging the concentric groove when the switch forms a portion of the inner wall of the same and to engage the cam groove and be reciprocated thereby when said switch forms a portion of the outer wall of the same, a needle arranged to reciprocate transversely of the baling case, a wheel frictionally engaging the bale and caused to make a revolution as each bale is formed, and means whereby said wheel at the end of each revolution shall cause the switch to form a part of the outer wall of the cam groove and the latter to effect reciprocatory action of said radial bar.

9. In a machine of the character described, a wheel provided with a concentric circular groove and an eccentric cam groove opening at its ends into the circular groove, a switch adapted at times to form a portion of the inner wall of the concentric groove and at other times a portion of the outer wall of the eccentric groove, a bar mounted to reciprocate radially of said wheel and provided with a roller engaging the concentric groove when the switch forms a portion of the inner wall of the same and to engage the cam groove and be reciprocated thereby when said switch forms a portion of the outer wall of the same, a needle arranged to reciprocate transversely of the baling case, a wheel frictionally engaging the bale and caused to make a revolution as each bale is formed, means whereby said wheel at the end of each revolution shall cause the switch to form a part of the outer wall of the cam groove and the latter to effect reciprocatory action of said radial bar, and means whereby said reciprocating bar shall cause the needle to reciprocate at the rear end of the completed bale.

10. In a machine of the character described, the combination of a driven wheel provided with a circular concentric groove and an eccentric cam groove opening at its ends into the concentric groove, a switch pivoted to the wheel and adapted to normally form a portion of the inner wall of the concentric groove and close the corresponding end of the cam groove and at times a portion of the outer wall of the cam groove and intersect the concentric groove, an arm projecting from the switch and normally occupying a position out of the plane of said grooves and projecting into the cam groove when the switch forms a portion of the outer wall of the same, a second arm rigid with the switch, a lever normally out of the path of the last-named switch arm, and means actuated by the completion of the bale in the baling case for causing said lever to assume a position in the path of said last-named switch arm and operate the same and thereby cause the switch to form a part of the outer wall of the cam groove and its other arm to project into said groove.

11. In a machine of the character described, the combination of a driven wheel provided with a circular concentric groove and an eccentric cam groove opening at its ends into the concentric groove, a switch pivoted to the wheel and adapted to normally form a portion of the inner wall of the concentric groove and close the corresponding end of the cam groove and at times a portion of the outer wall of the cam groove and intersect the concentric groove, an arm projecting from the switch and normally occupying a position out of the plane of said grooves and projecting into the cam groove when the switch forms a portion of the outer wall of the same, a second arm rigid with the switch, a lever normally out of the path of the last-named switch arm, means actuated by the completion of the bale in the baling case for causing said lever to assume a position in the path of the last-named switch arm and operate the same and thereby cause the switch to form a part of the outer wall of the cam groove and its other arm to project into said groove, and a suitably guided bar provided with a part to enter the cam groove and then engage the arm projecting therein and reverse the position of said switch.

12. In a machine of the character described, the combination of a driven wheel provided with a circular concentric groove and an eccentric cam groove opening at its ends into the concentric groove, a switch pivoted to the wheel and adapted to normally form a portion of the inner wall of the concentric groove and close the corresponding end of the cam groove and at times a portion of the outer wall of the cam groove and intersect the concentric groove, an arm projecting from the switch and normally occupying a position out of the plane of said grooves and projecting into the cam groove when the switch forms a portion of the outer wall of the same, a second arm rigid with the switch, a lever normally out of the path of the last-named switch arm, means actuated by the completion of the bale in the baling case for causing said lever to assume a position in the path of said last-named switch arm and operate the same and thereby cause the switch to form a part of the outer wall of the cam groove and its other arm to project into said groove, a suitably guided bar provided with a part to enter the cam groove and then engage the arm projecting therein and reverse the position of said switch, and means actuated by said bar to move said lever out of the path of said switch arm after the switch has been reversed.

13. In a machine of the character described, a driven wheel provided with a circular concentric groove and an eccentric cam groove opening at its ends into the concentric groove, a bar arranged radially of said wheel and suitably guided and provided with a roller normally engaging said concentric groove, a switch pivoted to the wheel and normally forming a part of the inner wall of the concentric groove and provided with an arm, a lever suitably pivoted and having a sliding pivotal connection with said bar and provided with a pin, a bar resting on said pin and provided forward of the same with a notch to engage the pin at times, a pivoted bar pivotally connected to the notched bar, a switch operating lever, a link connecting the last-named pivoted bar and the switch-operating lever, means for yieldingly disposing said lever in the path of the arm of the switch at times, a hammer lever suitably pivoted, a spring-retracted bar pivoted to said lever and suitably guided and provided with an angle arm, and a wheel adapted to be actuated by the bale and provided with a pin for engaging said angle arm to pivotally operate the lever connected thereto and then release said angle arm and permit said spring retracted bar to cause the lever connected thereto to trip the notched bar from engagement with the pin-carrying bar to permit the switch operating lever to move into the path of the arm of the switch.

14. In a machine of the character described, a driven wheel provided with a circular concentric groove and an eccentric cam groove opening at its ends into the concentric groove, a bar arranged radially of said wheel and suitably guided and provided with a roller normally engaging said concentric groove, a switch pivoted to the wheel and normally forming a part of the inner wall of the concentric groove and provided with an arm, a lever suitably pivoted and having a sliding pivotal connection with said bar and provided with a pin, a bar resting on said pin and provided forward of the same with a notch to engage the pin at times, a pivoted bar pivotally connected to the notched bar, a switch operating lever, a link connecting the last-named pivoted bar and the switch-operating lever, means for yieldingly disposing said lever in the path of the arm of the switch at times, a hammer lever suitably pivoted, a spring-retracted bar pivoted to said lever and suitably guided and provided with an angle arm, a wheel adapted to be actuated by the bale and provided with a pin for engaging said angle arm to pivotally operate the lever connected thereto and then release said angle arm and permit said spring retracted bar to cause the lever connected thereto to trip the notched bar from engagement with the pin-carrying bar to permit the switch-operating lever to move into the path of the arm of the switch lever, and means whereby the forward movement of the reciprocatory bar shall swing the pin-carrying bar forward until it reëngages said notch.

15. In a machine of the character described, a baling case provided with openings in its side walls, detents held yieldingly projected through the side walls, a guide roller contiguous to the opening in one side wall, a wire depressing frame between said roller and said opening, and a reciprocatory needle provided with an eye and adapted after passing through said openings of the baling case until said eye is below a wire leading into the case from said roller, to rock the frame and cause the same to depress the wire into the eye of the needle.

16. In a machine of the character described, a baling case provided with openings in its side walls, detents held yieldingly projected through the side walls, a guide roller contiguous to the opening in one side wall, a wire-depressing frame between said roller and said opening, a reciprocatory needle provided with an upwardly beveled surface and an eye at the rear end of said surface, and means for causing said needle to pass through said openings until its eye is contiguous to and below the wire leading from the roller into the baling case and its beveled surface has rocked said frame and caused the same to depress said wire into said eye.

17. The combination of a baling case provided with openings in its side walls and a reciprocatory plunger, guide rollers contiguous to said openings, for baling wires leading into the baling case, a transverse guide frame opposite said openings and at the opposite side of the baling case from said rollers, a reciprocatory frame mounted in said guide frame and provided with needles having eyes, pivoted frames contiguous to said rollers, detents to engage the bale as the plunger recedes after each compression stroke, and means actuated by the bale to cause the needle-carrying frame to reciprocate at certain times and in such reciprocation pass through the baling case forward of the bale and cause said pivoted frames to force the wires into the eyes of the needles and in its opposite movement to draw said wires across the end of the bale and through the opposite side of the baling case.

In testimony whereof I affix my signature, in the presence of two witnesses.

ROBERT C. REDPATH.

Witnesses:
H. C. RODGERS,
G. Y. THORPE.